Dec. 22, 1964   J. ROSÁN ETAL   3,162,228
WIRE COIL INSERT HAVING PLASTICALLY DEFORMABLE HEAD
PORTION AND METHOD OF MAKING SAME
Filed Dec. 23, 1960   2 Sheets-Sheet 1

INVENTORS.
JOSÉ ROSÁN
ALBERT JACK LA TORRE
BY
ATTORNEY

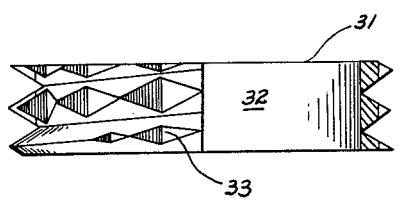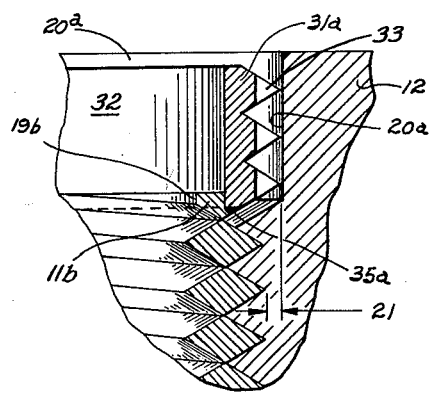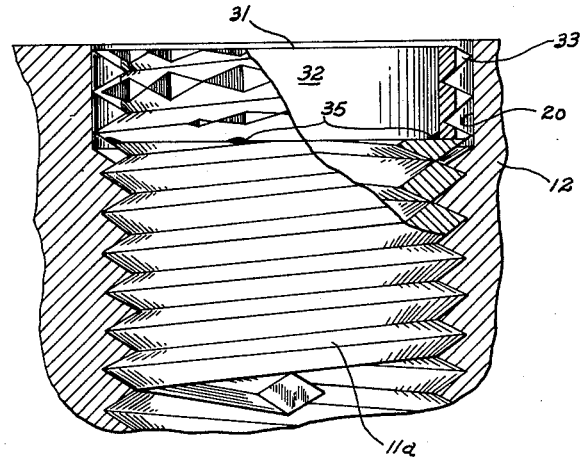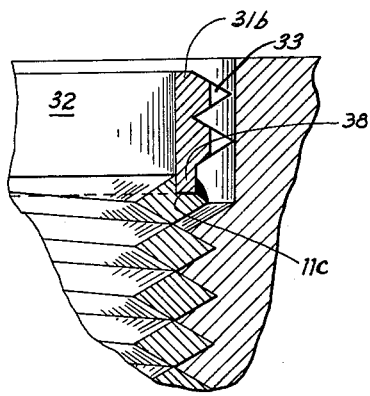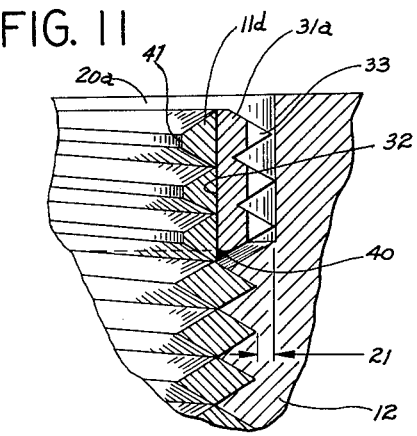

United States Patent Office 3,162,228
Patented Dec. 22, 1964

---

3,162,228
WIRE COIL INSERT HAVING PLASTICALLY DEFORMABLE HEAD PORTION AND METHOD OF MAKING SAME
José Rosán, San Juan Capistrano, and Albert Jack La Torre, Santa Ana, Calif., assignors to Rosan Engineering Corporation, Newport Beach, Calif., a corporation of California
Filed Dec. 23, 1960, Ser. No. 78,009
3 Claims. (Cl. 151—41.72)

This invention relates to an insert of the wire coil type, and to a method of locking it in a workpiece or body of parent material.

Inserts of the wire coil type are presently characterized by a substantial number of defects, one of which is that the individual turns or coils of the helix may jump between adjacent internal threads of the workpiece while a bolt or other fastener is being threaded into the insert. A further disadvantage of presently known inserts of the wire coil type is that the structure for locking the insert against unthreading, or backing out of the workpiece, is not sufficiently rigid and is not uniform about the entire circumference of the bore. Sufficient rigidity of the locking structure is important so that it is capable of permanent deformation when the elastic limit of the material is exceeded. Another important defect of wire coil type inserts is that the load borne by the internal threads of the insert is concentrated at a region adjacent the surface of the workpiece instead of being uniformly distributed along substantially the full length of the insert. Among the remaining disadvantages of such inserts is the relative difficulty of locking the same in the workpiece, the method of locking requiring a relatively complicated tool.

In view of the above and other factors which are characteristic of presently known wire coil type inserts, and methods of locking them, it is an object of the present invention to provide a wire coil type insert, the individual coils of which will not jump between adjacent internal threads of the workpiece when a bolt is threaded into the insert.

Another object is to provide a wire coil type insert characterized by extreme rigidity throughout the full circumference of the insert adjacent the locking means, and characterized by locking means which are provided around the full circumference of the insert.

A further object is to provide a wire coil type insert which is capable of forming its own counterbore adjacent the outer end of the bore in the workpiece, and in which the internal threads at the outer end of the insert are taken out of bearing so that the load is distributed along the remaining internal threads of the insert.

A further object is to provide a method of locking a wire coil type insert in a workpiece and simultaneously taking the outermost internal threads out of bearing, so that the load is uniformly distributed along the remaining threads, such method producing the additional important advantage that any adverse effects of misalignment between the individual coils at the outer end of the insert are eliminated.

These and other objects and advantages of the invention will be more fully set forth in the following specification and claims, considered in connection with the attached drawings to which they relate.

In the drawings:

FIGURE 7 is a view, in quarter section, illustrating a locking ring or collar adapted to be associated with a coil of wire to lock the same in a workpiece;

FIGURE 8 is a view, partially in side elevation and partially in section, illustrating the collar of FIGURE 7 connected with a coil of wire, as by welding;

FIGURE 9 is an enlarged fragmentary sectional view illustrating an embodiment which corresponds generally to that shown in FIGURE 8, but in which the locking collar is partially telescoped over a machined end of the wire coil;

FIGURE 10 is a view, partially in elevation and partially in section, showing a form similar to the one shown in FIGURE 9, there being a depending portion provided integrally at the lower end of the locking ring; and FIGURE 11 is an enlarged fragmentary sectional view illustrating an additional embodiment of the invention, such embodiment being characterized by a locking ring or collar which is fully telescoped over machined portions of the wire coil.

Figure 1:
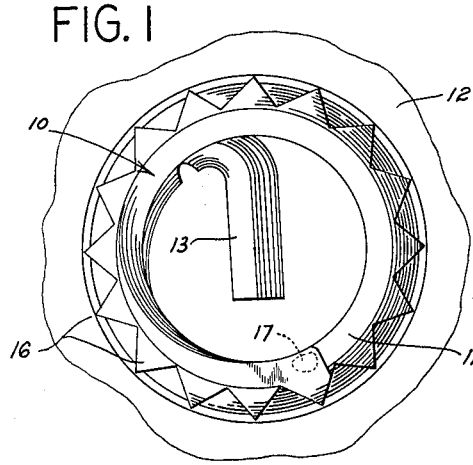
FIGURE 1 is a top plan view of a wire coil type insert constructed in accordance with the present invention.
Figure 4:
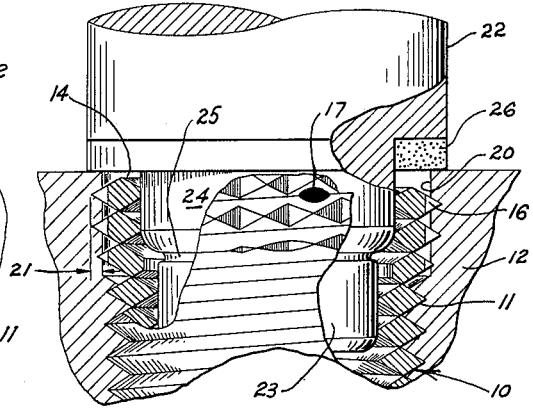
FIGURE 4 is a view corresponding to FIGURE 3 but showing the locking tool in fully-introduced position, at which the uppermost volutions or coils of the insert are swaged outwardly into locking relationship relative to the workpiece.
Figure 2:
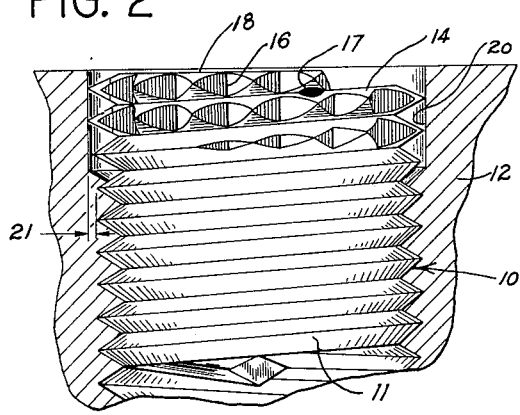
FIGURE 2 is a side elevation showing the insert threaded into a body of parent material.
Figure 3:
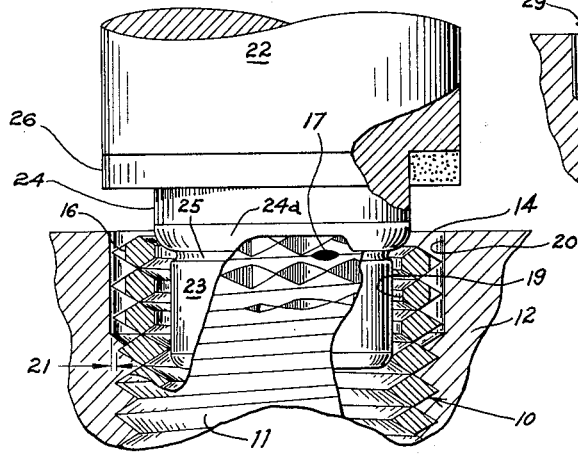
FIGURE 3 is a view, partially in side elevation and partially in vertical section, illustrating a locking tool as partially introduced into the insert.

Referring first to the embodiment illustrated in FIGURES 1–4, inclusive, the insert 10 is illustrated to comprovise a tightly-wound helix of wire, the wire normally (but not necessarily) having a diamond-shaped cross section as shown in FIGURES 3 and 4. Except as will be stated below, each individual coil or volution of the helix is not connected to the adjacent coils or volutions, but is disposed closely thereto, when disposed in an internally-threaded bore. It is to be understood that prior to threading of the wire helix into a bore in a body of parent material, the individual turns or coils of the shank may be somewhat separated from each other.

The insert comprises a shank portion 11 formed of helically-wound wire, as indicated above, and adapted to be threaded into an internally-threaded bore in a workpiece which is indicated at 12 in FIGURES 3 and 4. Threading of the shank 11 into workpiece 12 may be effected by means of a tang or drive portion 13 of the wire, such portion extending radially inwardly from the inner end of the shank.

The insert 10 further comprises a very important head, collar or locking portion 14 which is formed at one end of shank 11, normally remote from tang 13. The head or collar 14 has a number of important characteristics, among which are the following:

(1) The head is externally knurled throughout at least 360 degrees, and preferably 720 degrees or more, to form teeth 16 about its full circumference.

(2) At least two turns of the helix wire forming the head or locking portion 14 are tied together as by spot welds indicated at 17.

The end of the helix at head 14 is illustrated as being tapered in order that the upper face 18 of the head may lie in a plane perpendicular to the axis of the insert. Also, as shown in FIGURE 3, the head is suitably counterbored in order to take at least the outer two internal threads out of bearing. Thus, the inner portion of the head is formed with cylindrical faces 19 instead of the sharp crests or ridges which are characteristic of the threads of shank 11.

The insert 10 may be manufactured by effecting coiling of a length of wire having the desired cross-sectional shape, and then spot welding the volutions of the wire together, at head 14, as indicated at 17. Such spot-welded turns are closely adjacent each other. The insert is then knurled to form the external teeth 16, and is counterbored to form the faces 19 (FIGURE 3) and cause the internal threads at head 14 to be out of bearing. It is pointed out that such counterboring eliminates the effects of any coil misalignment resulting from the spot welding operation.

Referring next to FIGURES 3 and 4 for a description of the method and tool for locking the insert in workpiece 12, the insert is threaded into the workpiece as stated above and by the use of tank 13. Prior to such insertion, the upper end of the internally-threaded bore in workpiece 12 should be counterbored as indicated at 20, the counterbore having a diameter sufficient to provide a slight clearance (as shown at 21) relative to teeth 16 so that no binding action results during insertion. It is, however, within the scope of the invention to eliminate the counterbore 20 and cause the teeth 16 to wipe their own counterbore in the workpiece material, it being understood that the insert is normally formed of a material substantially harder than that of the workpiece.

It is then merely necessary to introduce into the insert a locking tool 22 having a pilot portion 23, the diameter of which corresponds to the inner diameter of the insert shank 11. The locking tool is formed above pilot portion 23 with a swage portion 24 shaped as a cylinder, the lower end of which is rounded or beveled as indicated. The rounded or beveled edge is separated from pilot portion 23 by an annular groove indicated at 25.

The swage portion 24 has a diameter sufficiently greater than the diameters of faces 19 so that introduction of such portion into the head 14 will effect outward expansion of the entire circumference of the head to the position shown in FIGURE 4. This will cause teeth 16 to penetrate into the workpiece material and create a locking action. The expansion is sufficient so that the locking action will be maintained after withdrawal of the tool 22, the metal forming the insert head 14 being deformed beyond its elastic limit.

Locking tool 22 may also have a stop and confining portion 26, formed of a material such as nylon or Teflon adapted to seat (FIGURE 4) on the upper face of workpiece 12 adjacent counterbore 20. The portion 26 not only limits the degree of insertion of the tool into the insert, but also prevents undesired flow of workpiece material when the teeth 16 penetrate therein.

It will thus be understood that the insert 10 is effectively locked in the workpiece 12, so that it will not back out upon removal of a bolt or stud previously threaded into the insert. Because of the above-described locking action and the tying together of the upper volutions of the helix, the turns of the helix will not jump between adjacent internal threads of the workpiece during introduction of a bolt or stud into the insert. Furthermore, because of the formation of faces 19, and also because of the expansion effected by swage portion 24, the head 14 of the insert is not in load-bearing relationship relative to a bolt or stud introduced into the insert, all load being taken by the threads of shank 11.

It is within the scope of the invention to refrain from forming faces 19 and rely solely upon the swaging operation to take the upper threads of the insert out of bearing. Such swaging also eliminates any adverse effects of misalignment between the helix turns of head 14 caused by the spot welding operation, as stated above.

Figure 5:
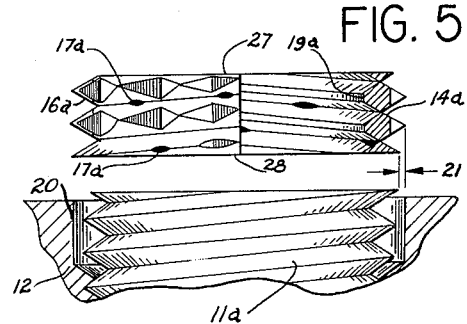
FIGURE 5 is a view, primarily in side elevation and partly in vertical section, illustrating a second embodiment of the invention wherein a knurled portion of the insert is separate from the main body thereof.
Figure 6:
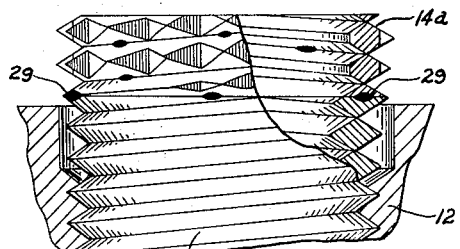
FIGURE 6 is a view corresponding to FIGURE 5 but illustrating a construction in which the upper and lower components of the embodiment of FIGURE 5 are secured together as by welding.

Referring next to FIGURES 5 and 6, an embodiment is shown wherein the head or locking portion 14a is not formed integral with the shank portion 11a. Head or locking portion 14a comprises a plurality of turns of wire wound in a tight helix, such turns being bored to form internal faces 19a, and being serrated to form external teeth or serrations 16a. Both ends of the helix wire are tapered in order that the upper and lower faces 27 and 28 of head 14a will lie in planes perpendicular to the axis thereof. A substantial number of spot welds 17a are employed to tie various coils or turns of head 14a rigidly together.

Referring particularly to FIGURE 5, the insert may be installed and locked merely by threading shank 11a into an internally-threaded bore in a workpiece, such bore being counterbored as indicated at 20 in FIGURE 3. The head or collar 14a is then disposed in the counterbore 20, in contact with the upper end of shank 11a, and is locked by means of tool 22 as described relative to FIGURES 3 and 4.

The construction in FIGURE 5 is particularly adapted to be employed relative to blind bores in the workpiece 12, in which it is impossible for the shank 11a to vibrate downwardly out of contact with head 14a. It is to be understood that the lower end of shank 11a is normally in contact with the inner end of the blind bore.

Referring next to FIGURE 6, a construction is shown in which welds 29 are employed to secure the head 14a to shank 11a, so that the insert is adapted for use both in blind bores and in through, or open bores. It is to be understood that the upper end of the coil which forms shank 11a should be tapered in order that the upper end of the shank will lie in a plane perpendicular to the axis thereof, permitting contact with head 14a throughout the full circumference of the insert.

In the embodiment of FIGURES 7 and 8, the shank 11a is again employed, comprising a tightly-wound helix of wire, but the head or locking portion 31 is not formed of wire but is instead a short tubular element of integral construction. The interior wall of head 31 is illustrated as being a cylindrical surface 32 the diameter of which is substantially greater than the inner diameter of the female thread portion of shank 11a.

The external surface of head 31 is threaded correspondingly to the external threads of shank 11a and is then formed with teeth 33, as by knurling. Teeth 33 therefore lie along a helical path having the same pitch angle as that of the turns of shank 11a. The head or locking portion 31 may be employed as described relative to head 14a of FIGURE 5, being placed in the counterbore 20 of workpiece 12 after introduction of shank 11a. The insert is then expanded, as previously described, to provide the locking action.

As shown in FIGURE 8, the head 31 may be secured to shank 11a as by spot welds 35 or by a circumferential arc weld or the like. The locking operation is then similar to that described relative to FIGURE 6, the insert being adapted to be employed in both blind holes and holes which are open at both ends.

Referring to FIGURE 9, a head or locking portion 31a is illustrated which is somewhat longer than the one described relative to FIGURES 7 and 8, having three thread turns instead of the two illustrated in those figures. Furthermore, the lower end of portion 31a is not merely in butt relationship with the upper surface of shank 11b but instead telescopes downwardly over a machined portion of the upper end of the shank. To permit such telescoping, a portion of the upper shank end is externally machined to form an annular groove or recess. The machining is such that the outer diameter of the shank end corresponds generally to the inner diameter of head 31a, that is to say the diameter of surface 32. Also, the upper end of the shank is counterbored to form face 19b. The telescoped parts are then secured together as by the weld or welds indicated at 35a.

The insert of FIGURE 9 is illustrated as being mounted in a workpiece 12 having a counterbore 20a which is somewhat deeper than the counterbore illustrated in FIG- URES 3 and 4, in order to accommodate the head 31a of greater depth. A tool similar to tool 22 (FIGURES 3 and 4) is then inserted to swage the head 31a outwardly into locking relationship relative to the workpiece.

The form shown in FIGURE 10 is the same as that of FIGURE 9, except that the head 31b is formed with a downwardly-extending or depending portion 38. As in thec ase of the form shown in FIGURE 9, the upper end portion of the shank 11c is machined to form an annular recess. Such recess is shaped with a cylindrical wall over which the depending portion 38 seats, and with a radially-extending wall against which the lower edge of portion 38 abuts.

The insert of FIGURE 10 is employed similarly to the insert of FIGURE 9, being threaded into the workpiece following which the head is expanded by a tool similar to the tool 22 of FIGURES 3 and 4.

Referring next to FIGURE 11, a construction is shown wherein the head 31a, corresponding to the one shown in FIGURE 9, is fully telescoped over the upper end of shank 11d. To permit this result, the upper three turns of shank 11d are externally machined to form a cylindrical surface the diameter of which is only slightly smaller than that of the internal head surface 32.

The head 31a is mounted on shank 11d by means of a circumferential weld indicated at 40, or by means of a plurality of spot welds, or by brazing or soldering as desired. Such brazing or soldering is performed between the abutting cylindrical surfaces at 32.

The insert of FIGURE 11 is employed in a manner similar to that which has been previously described, being threaded into the workpiece 12 so that the head 31a lies in the counterbored portion 20a, being recessed slightly below the surface of the workpiece or body of parent material. A tool similar to the locking tool 22 (FIGURES 3 and 4) is then inserted as previously described in order to expand the head and effect the locking action.

It is preferred that the threads at the upper end of shank 11d be internally counterbored to provide cylindrical faces 41 the diameters of which are substantially larger than the diameters of the crest portions of the female threads of the insert. This is not essential, however, since the above-indicated swaging operation is operative to swage the upper threads of the insert outwardly and take them out of bearing.

It is within the scope of the invention to eliminate the external teeth on the head portions of all embodiments of the invention.

The workpiece 12 may be formed of a large number of materials, for example aluminum, magnesium, plastic, etc. The insert, and the various heads or locking portions described, may be formed of various materials such as stainless steel, plain carbon steel, malleable aluminum, etc. As specific examples of material of which the insert and the head or locking portion may be formed, the workpiece may be formed of a metal such as 2024 T-4 aluminum alloy, or 356-T6 aluminum sand casting; the insert may be formed of a stainless steel known in the metallurgical field as "Armco 17-4 PH." As other specific examples the insert may be formed of an aluminum alloy such as 20-14T-6, or a steel alloy such as No. 4130.

Various embodiments of the present invention, in addition to what has been illustrated and described in detail, may be employed without departing from the scope of the accompanying claims.

We claim:

1. The method of making an insert having a helically-wound wire body and an integral head, said head provided with a locking means consisting of a plurality of knurls projecting from the external periphery of the head throughout the circumference thereof, comprising the steps of:
    helically winding a wire so as to form a coil;
    knurling the external periphery of a tube throughout the circumference thereof;
    welding said knurled tube axially to one end of said coil.

2. The method of making an insert having a helically-wound wire body and an integral head, said head comprised of longitudinally joined, adjacent convolutions of said wire thereby forming a continuous, uninterrupted, tubular wall, said head provided with a locking means consisting of a plurality of knurls projecting from the external periphery of the head throughout the circumference thereof, comprising the steps of:
    helically winding a wire so as to form a coil;
    welding together adjacent convolutions of said coil at one end thereof so as to provide a continuous, uninterrupted, tubular wall;
    permitting the adjacent convolutions in the remaining portion of said coil to remain free from any longitudinal bond;
    knurling the external periphery of the welded convolutions of said coil throughout the circumference thereof.

3. An insert comprising:
    a body, said body formed by helically-wound wire;
    an integral tubular head formed by at least two adjacent convolutions of the wire at one end of said body, said adjacent convolutions which form said head being longitudinally joined by a plurality of spot welds, said wire forming said head adapted to be readily expanded throughout its circumference, the adjacent convolutions in the remaining portion of said body being free from any longitudinal bond, said wire forming said body being shaped so as to form external and internal threads;
    locking means comprised of a plurality of projecting serrations provided throughout the circumference of the external periphery of said head, said locking means adapted to lock in the bore of the workpiece.

References Cited in the file of this patent

UNITED STATES PATENTS

| | | |
|---|---|---|
| 2,390,514 | Cram | Dec. 11, 1945 |
| 2,439,687 | Rindley | Apr. 13, 1948 |
| 2,512,316 | Eckener | June 20, 1950 |
| 2,577,810 | Rosan | Dec. 11, 1951 |
| 2,775,281 | Smith | Dec. 25, 1956 |

FOREIGN PATENTS

| | | |
|---|---|---|
| 610,869 | Great Britain | Oct. 21, 1948 |